United States Patent [19]

Morgan et al.

[11] Patent Number: 5,482,999
[45] Date of Patent: Jan. 9, 1996

[54] POLYMER MIXTURE WHICH COMPRISES A POLYPHENYLENE ETHER AND A STYRENE-CONTAINING POLYMER OR COPOLYMER, AS WELL AS PRODUCTS FORMED THEREFROM

[75] Inventors: Sarah E. Morgan, Evansville, Ind.; Charles F. Pratt, Brasschaat, Belgium; Cinzia A. R. di Fede, Putte; Julia A. J. M. Verdult-van Aert, Huybergen, both of Netherlands

[73] Assignee: General Electric Company, Pittsfield, Mass.

[21] Appl. No.: 185,724

[22] Filed: Jan. 24, 1994

Related U.S. Application Data

[63] Continuation of Ser. No. 901,333, Jun. 19, 1992, abandoned.

[30] Foreign Application Priority Data

Jun. 19, 1991 [EP] European Pat. Off. ............ 91110065

[51] Int. Cl.[6] .......................... C08L 25/04; C08L 71/12
[52] U.S. Cl. ............................................. 525/68; 525/132
[58] Field of Search ........................................ 525/68, 132

[56] References Cited

U.S. PATENT DOCUMENTS

| | | | |
|---|---|---|---|
| 4,792,586 | 12/1988 | Han .......................................... | 525/92 |
| 4,914,153 | 4/1990 | Togo et al. ................................ | 525/68 |
| 4,959,415 | 9/1990 | Taubitz et al. ........................... | 525/92 |
| 4,962,157 | 10/1990 | Taubitz et al. ........................... | 525/68 |
| 5,112,914 | 5/1992 | Mizuno et al. .......................... | 525/397 |

FOREIGN PATENT DOCUMENTS 0146965  7/1985  European Pat. Off. .

*Primary Examiner*—Thomas Hamilton, III

[57] ABSTRACT

The invention relates to a mixture of a polyphenylene ether resin and a styrene-containing polymer or copolymer, in which at least a part of the polyphenylene ether resin is modified with reactive groups of a first type and at least a part of the styrene-containing polymer or copolymer is modified with reactive groups of a second type which are capable of reacting with the reactive groups of the first type. The invention further relates to articles formed from the said mixture, which have a good combination of low surface gloss and mechanical properties.

5 Claims, No Drawings

POLYMER MIXTURE WHICH COMPRISES A POLYPHENYLENE ETHER AND A STYRENE-CONTAINING POLYMER OR COPOLYMER, AS WELL AS PRODUCTS FORMED THEREFROM

This is a continuation of application(s) Ser. No. 07/901,333, filed on Jun. 19, 1992, now abandoned.

Polymer mixture which comprises a polyphenylene ether and a styrene-containing polymer or copolymer, as well as products formed therefrom.

The invention relates to a polymer mixture which comprises a polyphenylene ether and a styrene-containing polymer or copolymer. The invention also relates to products formed from polymer mixtures of the invention.

Such mixtures have many favourable mechanical properties. Moulded parts show a relatively high gloss. For certain applications, for example for the interior of motorcars, a dull material is desirable.

It has now been found that the combination, never tested before, of polyphenylene ether and styrene units-containing polymers or copolymers made coreactive provides surprising effect, namely dull materials, which as a result of this are excellently suitable for a number of applications which up till now had not been possible.

The invention therefore provides a polymer mixture which comprises a polyphenylene ether and a styrene-containing polymer or copolymer and which is characterised in that at least a part of the polyphenylene ether is modified with reactive groups of a first type and that at least a part of the styrene-containing polymer or copolymer is modified with reactive groups of a second type which are capable of reacting with the reactive groups of the first type.

The invention also relates to the products manufactured by means of the said mixtures.

It is known per se from EP-A-0 146 965 to prepare mixtures of two normally incompatible polymers by incorporating in one of the polymers repeating units which comprise cyclic iminoether groups bound to the chain, and using another polymer which comprises groups which are reactive therewith. In the experimental part of the publication the cyclic iminoether groups are always incorporated in a styrene polymer or styrene copolymer. Experiments are described with different polymers with carboxyl groups reactive therewith, but it always relates to polymers quite different from polyphenylene ethers and nothing has been reported on gloss.

WO 86/02086 relates to making polyphenylene ether resin and polyamide resin compatible. For this purpose the polyphenylene ether is provided with terminal groups which are reactive with polyamide, for example, a dicarboxylic acid anhydride. One compound preferably used for the introduction of the said terminal groups is trimellitic acid anhydride-acid chloride.

The nature of the modifying groups for the polyphenylene ether and the styrene(co)polymer is little critical; the only requirement is that they must be capable of reacting with each other and that their combination does not adversely influence the total desired properties of the mixture. Of course, groups will preferably be chosen which can easily be introduced. Since, as appears from the above description of the prior art, experience has already been gained with the introduction of certain groups, the first experiments with these types of groups have been performed and hence these groups are now be preferred.

The polyphenylene ethers are described in greater detail in the publication WO 86/02086, page 8, lines 20 to page 12, line 12 mentioned hereinbefore, in which references to U.S. Pat. Nos. 3,306,874, 3,306,875, 3,257,357, 3,257,358, 3,337,501 and 3,787,361 are made. Just as in these publications poly(2,6-disubstituted 1,4-phenylene)ethers and in particular poly(2,6-dimethyl-1,4-phenylene)ether are to be preferred in this case also.

The polyphenylene ether is provided at least partly with reactive groups. It is not necessary to use exclusively polyether comprising reactive groups, small quantities of modified polyether will already suffice. For example, mixtures may be used of 2–98% by weight of non-modified polyphenylene ether and 98–2% by weight of modified polyphenylene ether.

The introduction of the reactive groups may again be carried out suitable as described in WO 86/02086, in particular with trimellitic acid anhydride-acid chloride (abbreviated as TAAC), with which good experience has been gained. However, it is by no means necessary to introduce carboxyl groups as reactive groups; the only requirement is that the reactive groups with which the polyphenylene ether and the styrene-containing polymer are modified must be capable of reacting with each other.

Styrene resins, or more generally resins derived entirely or partly from aromatic alkenyl compounds, are known as components in blends with polyphenylene ether resins. According to WO 86/02086 they may also be added for a further improvement of the properties of the mixtures obtained there. Introduction of reactive groups to said polymers and copolymers, however, is not mentioned. For a further description of the said styrene resins reference is made to page 21, lines 6–22 of WO 86/02086.

The polyphenylene ether based composition according to the invention comprises a styrene containing polymer or copolymer modified with reactive groups of a second type, which can react with the reactive groups of the modified polyphenylene ether. It is possible to use a blend of a non-modified and a modified styrene containing polymer or copolymer, e.g. in a ratio by weight chosen between 98:2 and 2:98.

If the polyphenylene ether has carboxyl groups-containing reactive groups, reactive groups of the type as described in EP-A-0 146 965 are suitable in the styrene resin component.

In that case other reactive groups of the second type are suitable also e.g. epoxygroups.

Of course, the materials of the invention may comprise further conventionally used additives, for example, fillers, reinforcing fillers, colour stabilisers, mould-rolling agents, flame retardants, etc.

The invention will now be described in greater detail with reference to the following non-limiting specific examples I and II.

All patents mentioned herein are herewith incorporated by reference.

EXAMPLE I

Pigmented mixtures of poly-(2,6-dimethyl-phenyl)ether (PPE) and high impact polystyrene (HIPS) of the following composition were prepared: standard mixture: 30% by weight PPE, 53% by weight HIPS having a content of 9% rubber of particle size approximately 2 micrometer, 12% by weight ethylene-butylene rubber and 5% by weight pigment. The mixture of the invention comprised 10% by weight PPE modified with 1.7% trimellitic acid anhydride-acid chloride (PPE-TAAC) and 10% polystyrene with 5% oxazoline reactive groups (RPS) and accordingly 20% PPE and 43% HIPS. The mixtures were compounded in a Werner-Pfleiderer extruder and the processed under two different sets of conditions by injection moulding to test rods. One series of samples was injection moulded at low speed (40% of the maximum speed of the machine), the other at high speed (75% of the maximum speed). The gloss was measured according to ASTM D523 at an angle of 60° and at 85°. The physical properties are recorded in the table A hereinafter. Gloss is appreciably lower under all processing conditions for the mixture according the invention, while mechanical properties are similar to the standard.

TABLE A

|  | Standard | Mixture according to the invention |
|---|---|---|
| Gloss at 60° | | |
| Low-speed injection moulding | 38 | 11 |
| High-speed injection moulding | 47 | 15 |
| Gloss at 85° | | |
| Low-speed injection moulding | 90 | 54 |
| High-speed injection moulding | 91 | 69 |
| Izod notched impact value at room temperature (J/m) | 310 | 380 |
| Impact strength test with falling dart at room temperature (J) | 37 | 60 |
| Elongation limit (MPA) | 42 | 46 |
| Fracture elongation | 33 | 32 |

EXAMPLE II

Mixtures of a poly-(2,6-dimethyl-phenyl)ether (PPE) and high impact polystyrene (HIPS) of the following composition were prepared.

Standard mixture: 30% by weight PPE, 53% by weight HIPS having a content of 9% rubber of particle size approximately 2 micrometers, 12% by weight ethylenebutylene rubber and 5% by weight pigment.

Mixture according to the invention: 5% by weight of the PPE in the standard mixture has been replaced by the same PPE-TAAC as used in example I; 2% of the HIPS had been replaced by a random copolymer of styrene and glycidyl methacrylate with a glycidyl methacrylate content of 3%.

The mixtures were compounded in a Werner Pfleiderer extruder and then processed at a 40 mm/sec. injection speed (53% of maximum speed) by injection moulding into test plaques. The results are summarised in table B.

TABLE B

|  | Standard mixture | Mixture according to the invention |
|---|---|---|
| Gloss at 60° | 13 | 6 |
| Gloss at 85° | 64 | 31 |
| Impact strength with falling dart at room temperature (J) | 66 | 68 |
| Impact strength with falling dart at −30° C. (J) | 52 | 64 |

We claim:

1. A polymer mixture which comprises a polyphenylene ether resin and a polystyrene-containing polymer or copolymer, characterized in that at least part of the polyphenylene ether resin is modified with reactive groups of a first type and that at least part of the polystyrene-containing polymer or copolymer is modified with reactive groups of a second type which are capable of reacting with the reactive groups of the first type;

wherein the polyphenylene ether resin is modified with acid groups or derivatives thereof;

wherein the polystyrene-containing polymer or copolymer is a polystyrene homopolymer, a rubber modified polystyrene, a high impact polystyrene, or a styrene-acrylonitrile copolymer; and wherein the polystyrene-containing polymer or copolymer is modified with an oxazoline group or an epoxy group.

2. A polymer mixture as claimed in claim 1, characterised in that it comprises a) 2–98 parts by weight of a mixture of a non-modified polyphenylene ether resin and modified polyphenylene ether resin, and b) 98–2 parts by weight of a mixture of a non-modified polystyrene-containing polymer or copolymer and modified polystyrene-containing polymer or copolymer per 100 parts by weight of a+b.

3. A polymer mixture as claimed in claim 2, characterised in that the mixture a) consists of a1. 2–98% by weight of a non-modified polyphenylene ether resin and a2. 98–2% by weight of the modified polyphenylene ether resin.

4. A polymer mixture as claimed in claim 2, characterised in that mixture b) comprises b1. 2–98% by weight of a non-modified polystyrene-containing polymer or copolymer and b2. 98–2% by weight of the modified polystyrene-containing polymer or copolymer.

5. Articles formed from a polymer mixture according to claim 1.

* * * * *